United States Patent [19]
van Overbruggen et al.

[11] 4,334,640
[45] Jun. 15, 1982

[54] EXCHANGEABLE CONCENTRATE CONTAINER FOR BEVERAGE DISPENSING MACHINES

[75] Inventors: Garardus J. J. van Overbruggen, Vianen; Richard A. van Beaumont, Harmelen; Henricus A. C. Thijssen, Son, all of Netherlands

[73] Assignee: Douwe Egberts Koninklijke Tabaksfabriek-Koffiebranderijen-Theehandel B.V., Joure, Netherlands

[21] Appl. No.: 196,564

[22] Filed: Oct. 14, 1980

Related U.S. Application Data

[63] Continuation of Ser. No. 930,538, Aug. 2, 1978, abandoned.

[30] Foreign Application Priority Data

Aug. 8, 1977 [NL] Netherlands ........................ 7708746
Oct. 6, 1977 [NL] Netherlands ........................ 7710961

[51] Int. Cl.³ ............................................. B65D 37/00
[52] U.S. Cl. ........................... 222/207; 128/DIG. 12; 222/214; 251/5; 417/394; 417/477
[58] Field of Search ............... 222/105, 107, 207, 209, 222/213, 214, 215, 354, 355, 373, 380, 494; 417/477, 394; 128/214 D, 214 F, DIG. 12; 251/5, 6

[56] References Cited

U.S. PATENT DOCUMENTS

| 2,772,817 | 12/1956 | Jauch | 222/207 |
| 2,904,063 | 9/1959 | Wall et al. | 251/5 X |
| 3,052,238 | 9/1962 | Broman et al. | 128/214 F |
| 3,211,340 | 10/1965 | Zander et al. | 222/105 X |
| 3,881,641 | 5/1975 | Pliml, Jr. et al. | 222/207 |
| 3,918,854 | 11/1975 | Cartarious et al. | 417/477 |
| 3,921,630 | 11/1975 | McPhee | 222/107 X |
| 4,104,005 | 8/1978 | Poirer | 417/394 |
| 4,106,533 | 8/1978 | Herzig | 222/373 X |
| 4,168,020 | 9/1979 | Benson | 222/207 |

FOREIGN PATENT DOCUMENTS 503003 5/1954 Canada ............................... 222/105

Primary Examiner—Gil Weidenfeld
Assistant Examiner—Fred A. Silverberg
Attorney, Agent, or Firm—Cushman, Darby & Cushman

[57] ABSTRACT

Apparatus for dispensing a liquid beverage concentrate comprises a concentrate reservoir, a resilient dispensing tube having one end in communication with the reservoir via a non-return valve opening into the tube and having an opposite dispensing end provided with a non-return valve opening outwardly, and a pressure fluid device for squeezing a portion of the dispensing tube so as to force a quantity of concentrate through the dispensing end of the tube, the pressure fluid device including a deformable sleeve loosely fitting over the tube and separating the tube from the pressure fluid.

1 Claim, 5 Drawing Figures

EXCHANGEABLE CONCENTRATE CONTAINER FOR BEVERAGE DISPENSING MACHINES

This is a continuation of application Ser. No. 930,538 filed Aug. 2, 1978, now abandoned.

BACKGROUND

In beverage vending-machines a small quantity of concentrate is dispensed which is diluted to normal utilization strength. Beverage vending-machines are used for instance for coffee, tea, chocolate and soft drinks. The concentrates are diluted, according to the beverage in question, with a 3–50 fold quantity of water. Normally it concerns the dispensing of a quantity of concentrate which may vary from a few to a few dozens of milliliters. A concentrate container in the conventional commercial apparatuses, which form part of the vending-machine, is filled with concentrate. From said container a quantity of concentrate is dispensed via a dispensing device associated with the vending-machine.

Several drawbacks are connected therewith. In the first place the concentrate is intensively contacted with air supplied from outside, easily resulting in microbiological contamination. The contact with the air has moreover the drawback that accelerated aging may occur, since many of the concentrates in question are sensitive to oxygen. A second drawback is that the concentrate comes into contact with various parts of the machine. These parts will thereby be contaminated to a minor or major extent, in that rests of extract will remain. It is therefore necessary that these parts are periodically cleaned and, if necessary, disinfected. This procedure is very timeconsuming in general and can only be performed by skilled operators.

SUMMARY OF THE INVENTION

The present invention concerns an exchangeable container for beverage dispensing machines characterized in that the container comprises a reservoir for beverage concentrate and a non-disconnectible dispensing portion fixedly connected to the reservoir. By exchangeable is meant that the container can be removed from a dispensing machine and exchanged for another container.

This arrangement enables to maintain concentrates which have been provided in the factory with an aseptical or sterile package, in this state till the moment of dispensing.

A practical embodiment for instance is the one wherein a solid resilient hose is used as a dispensing portion. This hose, which is filled with concentrate, might for instance be squeezed empty by a peristaltic type of pump or a finger pump. The rolls of the peristaltic type of pump or the fingers of the finger pump ensure alternately that the concentrate in the container is permanently shut off from the outside air. Besides a hose, naturally also a differently formed space provided with a resilient wall may be used. By making the reservoir of such deformable material, that upon withdrawal of the concentrate from the reservoir there is produced a reduction of volume of the reservoir that is equal to the volume of the withdrawn concentrate, it will not be necessary to vent the reservoir. Rigid reservoirs, provided with a venting device are also possible naturally, but then in case of non-self-conserving extracts there is required a provision for admitting purified, filtered air (see e.g. Swiss Pat. No. 414977).

In order to avoid drying out and/or tails of concentrate from that section of the dispensing portion which is in contact with the outside air (the section underneath the sealing through the pump body), the bottom of the dispensing portion may be provided with a constriction or an outwardly opening valve.

Figure 1:
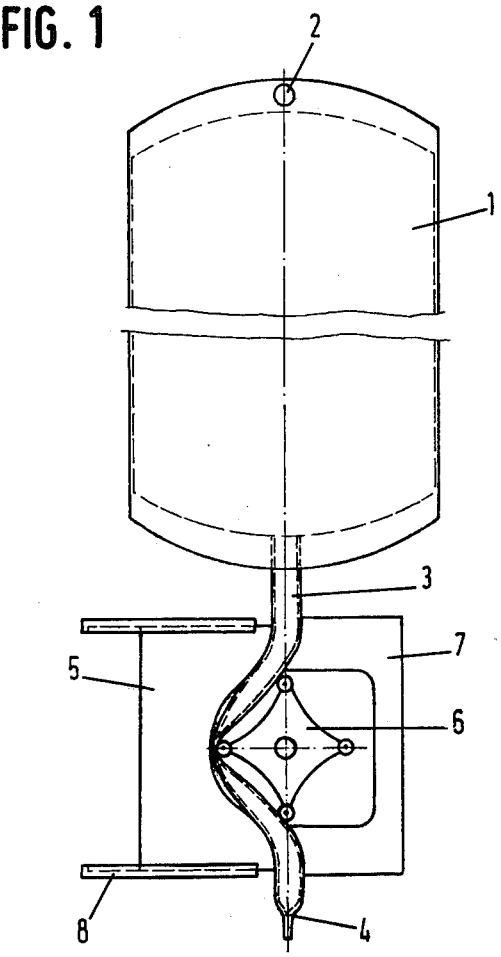
FIG. 1 is a diagrammatic elevational view of a dispensing apparatus embodying the present invention.

A diagrammatic picture of a possible embodiment is shown in FIG. 1. By (1) is indicated a reservoir that is easily deformable through the influence of atmospheric pressure, which is provided at the top with a suspension device (2). The reservoir may e.g. be made of food-grade polyethylene. At the bottom of the reservoir (1), fixedly connected to the reservoir, there is attached a solid resilient tube (3), which tube may be made of food-grade silicon hose, having a wall thickness of 2 mm. The resilient tube (3) is flat at the bottom. This flatened portion (4) functions as non-return valve, ensuring that the concentrate in the tube is not in contact with air. At the one side the hose is pressed against a block (5), which block (5) on the one end has the function of a seat for the peristaltic type of pump (6), while on the other end it is a portion of the retaining device for the resilient tube. The other portion of said retaining device is formed by the supporting body (7) fixed via a frame to the peristaltic type of pump. Said frame is not shown on the drawing. The block (5) is attached via a guide (8) to the same frame and is fixed by means of a snap slot, (not shown on the drawing), relative to the peristaltic type of pump (6) and the supporting body (7).

To enable insertion of the resilient tube (3), the block (5) may be displaced along the guide a few centimeters to the left.

By rotating the peristaltic type of pump during a specific period of time at a fixed speed, there is obtained a properly reproducible dosing that is independent of the viscosity of the concentrate. When another quantity is to be dosed, this can be realized by varying the dosing time.

Another embodiment is that wherein use is made of an exchangeable container for the concentrate, consisting of a reservoir that is easily compressible under influence of atmospheric pressure, coupled to a tubular dispensing portion of solid resilient material, which is separated at the one end of the reservoir by a valve opening into the dispensing portion and at the other, free end being provided with an outwardly opening valve. Reservoir and tubular dispensing portion are integral.

The tubular dispensing portion is then pushed in the collapsible tube loosely fitting therearound, about which there is present a pressure transmitting fluid.

The reservoir for the concentrate may naturally also be of rigid design and/or be interchangeable relative to the tubular dispensing portion, but then, in case of non-self-conserving extracts, a provision is required to admit purified filtered air (see for instance Swiss Pat. No. 414977).

Figure 2:
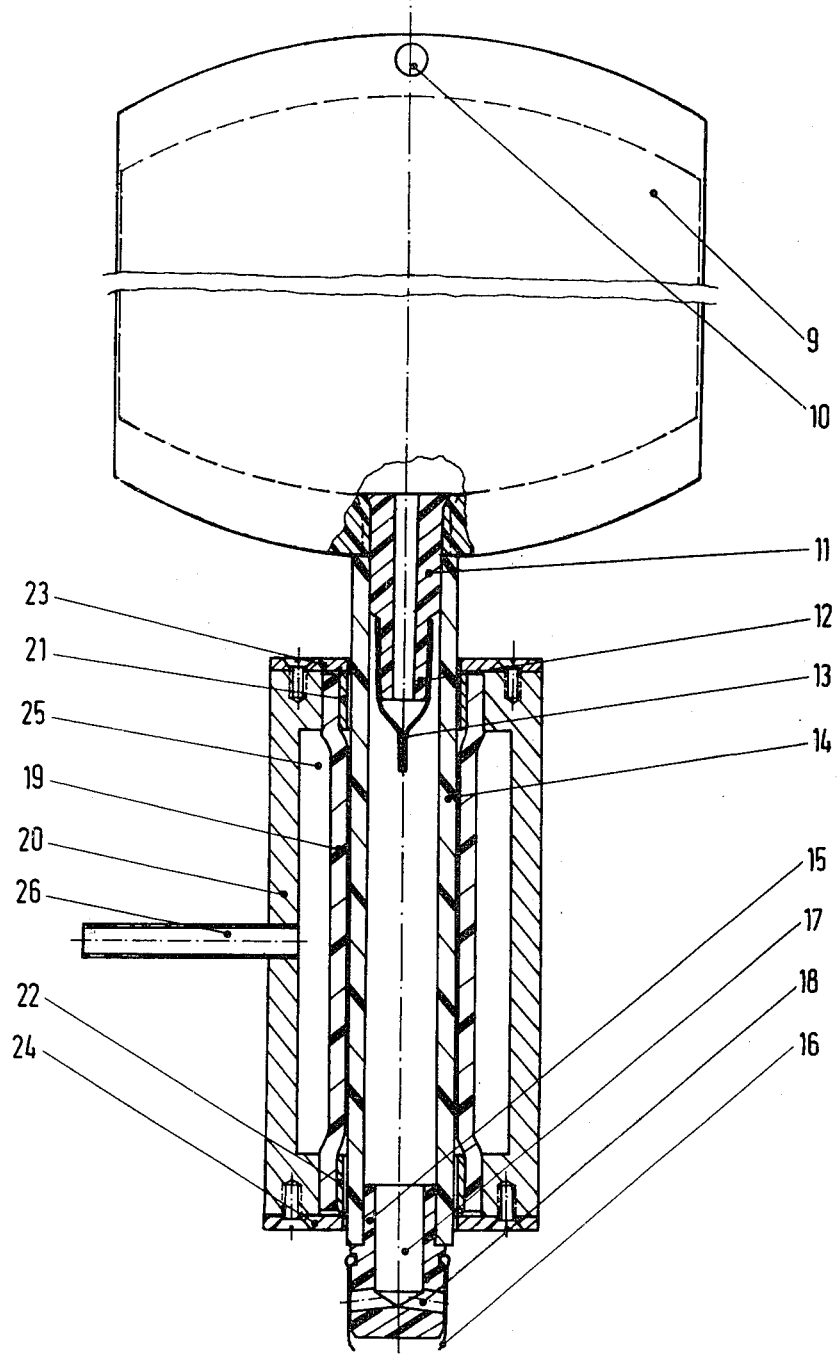
FIG. 2 is a diagrammatic elevational view, partly in section, of a second embodiment of a dispensing apparatus.

FIG. 2 shows this embodiment in cross-section. By (9) is indicated the easily deformable reservoir of the exchangeable container which is provided at the top with a suspension device (10), at (11) is indicated the rigid neck of the container. The reservoir may for instance be made of food-grade polyethelene, the rigid neck for instance of solid polyester. About the narrowed portion (12) of the neck there is overturned a flat resilient hose (13). The lower flat portion functions as non-return valve. Said resilient hose may for instance be made of food-grade latex having a wall thickness of e.g. approximately 1 mm. About the widened portion of the neck (11) is fitting a tube (14) of solid resilient material. Said tube may for instance be made of food-grade silicon hose ("Phyton" hose had been found suitable inter alia), having a wall thickness of e.g. approximately 2 mm. The tube (14) is provided at the bottom with a synthetic cap (15) (e.g. polyester), whereabout is pushed a thin resilient piece of hose (16). The valve effect of the cap (15) and the hose (16) is obtained in that a central bore (17) communicates with a plurality of radial bores (18), while the openings of said bores (18) are closed by the thin, resilient piece of hose (16) which is clamped about the lower portion of the cap (15). The hose (16) may for instance be made of food-grade latex and have a wall thickness of 0.1 mm.

The tube (14) is slidable in the collapsible tube (19) made for instance of silicon hose having a wall thickness of e.g. approximately 3 mm. The tube (19) is mounted in the cylindrical metal housing (20). For mounting the tube (19) in the housing (20) function the thin metal sleeves (21) and (22). The annular collars (23) and (24), attached through bolts to the housing (20), function for retaining the sleeves (21) and (22). The metal housing with the collapsible tube mounted therein are integral with the beverage dispensing machine, and constitute an apparatus for squeezing the tubular dispensing portion tight by means of an omnilaterally exerting fluid pressure.

The pressure transmitting fluid may be liquid or gas. In this embodiment water is chosen as pressure transmitting fluid.

Figure 3:
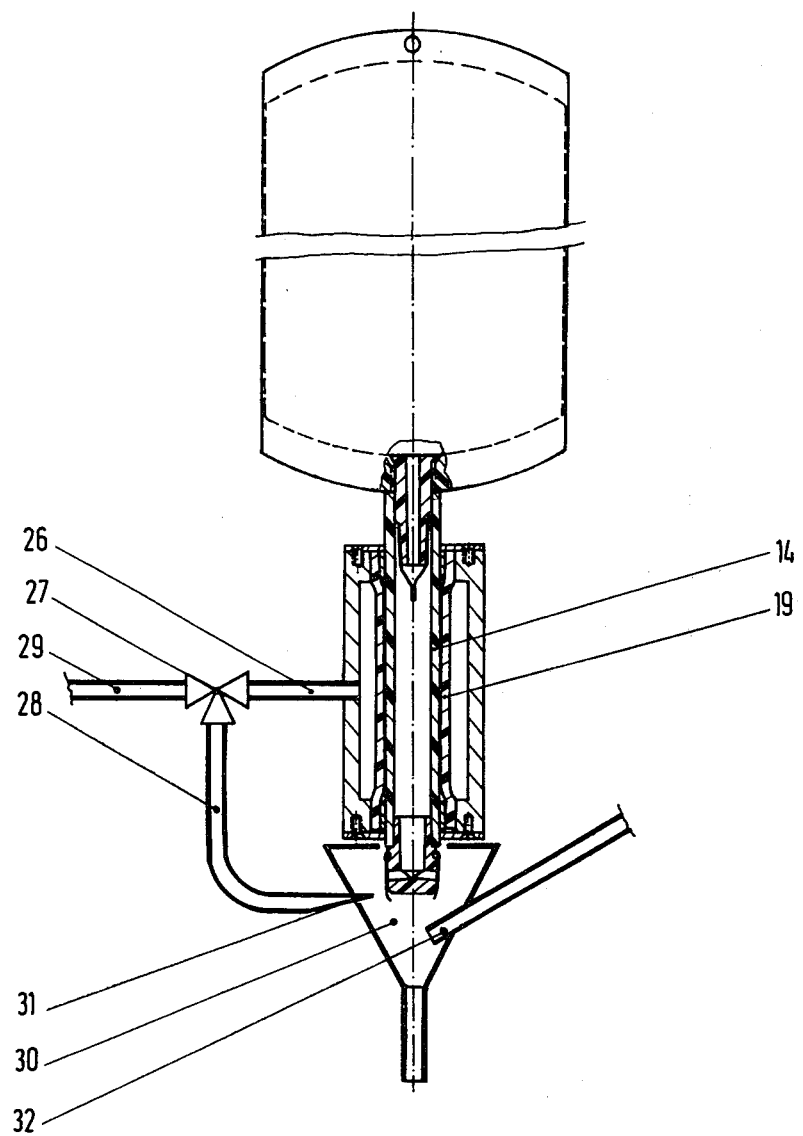
FIG. 3 is a diagrammatic elevational view, partly in section, of a dispensing machine which includes a dispensing apparatus as shown in FIG. 2.

The space for the pressure fluid (25) remaining in the housing (20) between the outer wall of the housing (20) and the collapsible tube (19) is in communication via pipe (26) with a three-way cock, as shown in FIG. 3.

FIG. 3 shows at (27) a magnetically operated three-way cock (mark "Lucifer," Geneva, type 131A04). In the rest position the pipe (26) is in communication with pipe (28). In case the dispensing machine is put into operation, the pipe (26) is in communication for a short period of time with pipe (29) which in turn is in communication with the water supply system. The operation of the three-way cock is effected for example by means of a time relay, as normally present in beverage dispensing machines. During said short period the pipe (19) and as a result also pipe (14) is squeezed tight by the water pressure, thereby imparting a flat shape to the tubes (19) and (14) while substantially all concentrate being present within the tube (14) is forced out via the lower valve extensively discussed in FIG. 2.

The concentrate arrives via funnel (30) in the drinking cup, not shown. After the dispensing of the concentrate the pipe (26) is again put in communication through the three-way cock (27) with the pipe (28). The resilient tubes (14) and (19) resume their original round shape, allowing a quantity of water equal to the dispensed quantity of concentrate to be squirted from the narrow opening (31) of the tube (28) into the funnel (30). This water washes away any concentrate adhering to the lower valve. Dispensing of the dilution water is conventionally effected via the supply pipe (32).

With the apparatus according to the invention, as described in the above, a high accuracy and reproducibility can be achieved. It was found that when use was made of resilient tubes (14) and (19) of e.g. phyton silicon and tygon having inner diameters varying from 8–25 mm and wall thicknesses varying from 2–4 mm, that at an excess pressure of the water supply system of more than 1 atmosphere already a substantially maximal expulsion of the concentrate was obtained. This means that increase of the pressure has practically no influence on the dosing quantity. Since the excess pressures in water supply systems normally vary between 1.5 and 6 atmosphere, it appears that practically the same dosage is obtained everywhere.

Extensive reproducibility tests have been carried out with this embodiment in two dispensing quantities (8 and 20 cc). In the first place the relative accuracy of both dispensing quantities appeared to be equally large.

The reproducibility for one specific type of liquid, expressed by the variation coefficient in a large series of tests was found to be 1–1½%. It also appeared that the dispensing accuracy was hardly sensitive to viscosity differences. Six liquids having viscosities ranging from 1–200 centipoise were measured. These liquids were: coffee extract, tea extract (both of two different types), chocolate beverage concentrate and orange concentrate. Some of these liquids were strongly gelled, while the orange concentrate contained flesh. The overall variation coefficient found during these tests (calculated from the deviations of the individual dosages relative to average dosage of all different extracts together) was 2.8%.

Figure 4:
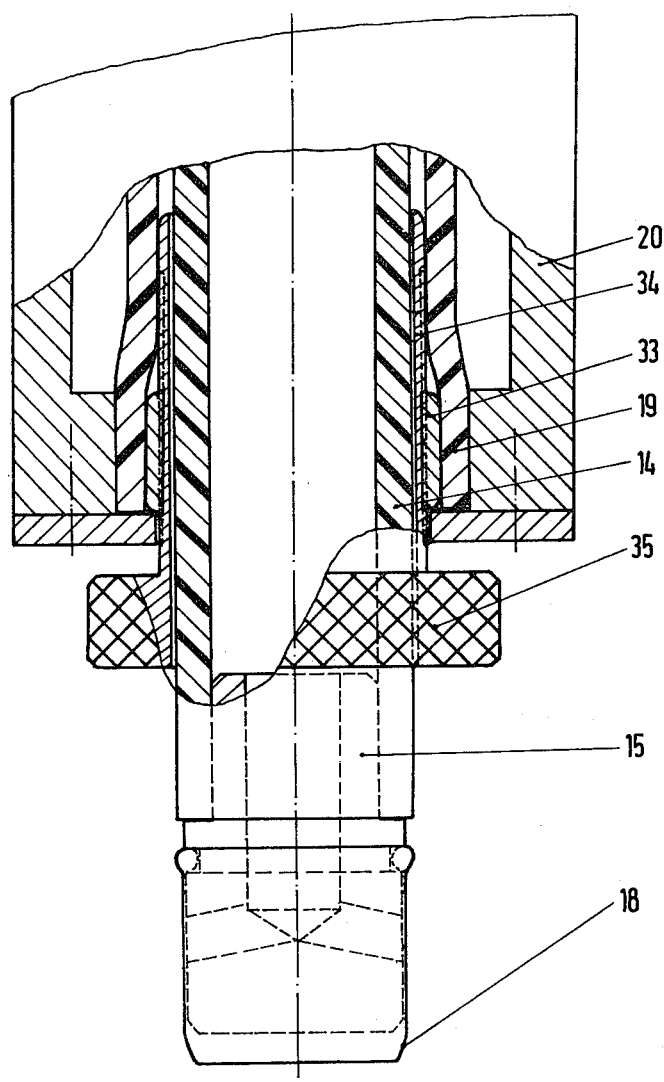
FIG. 4 is a fragmentary view of a modified embodiment similar to FIG. 2.

In certain cases it may be important to make the dispensing quantity slightly adjustable. An apparatus allowing to do this is shown in FIG. 4, which represents the bottom of a type of apparatus which was discussed in FIG. 2, and which represents partly a cross-section and partly a view. By (19) again is indicated the outer collapsible tube and by (14) the inner resilient tube. The retaining sleeve (33) (in this embodiment replacing the sleeve (22) in FIG. 2) is provided at the inside with a fine thread. A nipple (34) is screwable in said retaining sleeve (33), to which nipple is fixedly connected an externally knurled head (35). By screwing the nipple in or out the squeezable portion of hose (19) and as a result of (14) may be varied.

Figure 5:
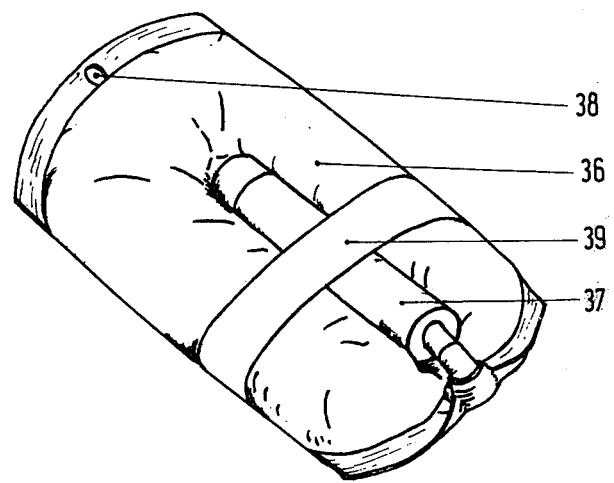
FIG. 5 is a perspective view of a transportable unit which includes a reservoir and a dispensing device.

FIG. 5 shows a perspective view of a filled exchangeable container consisting of a thin-walled plastic reservoir (36) and the interconnected resilient tube having valves (37) suitable for a dosage of 7 cc. This tube with valves has numerals (11)-(18) in FIG. 2. The suspension device can be seen at (38). To facilitate transport the tube (37) is tilted up against reservoir (36) and retained in place by the band (39) which is removed when the container is positioned in the beverage dispensing machine. In its entirety a reservoir of 1 dm$^3$ with dispensing device has maximal dimensions of 20×12×5.5 cm during transport.

We claim:

1. An apparatus for storing and transporting coffee concentrate and dispensing increments of the concentrate comprising:

an exchangeable disposable dispensing unit including a reservoir containing coffee concentrate and having a rigid neck with an open end defining an outlet, means on the open end forming a first non-return valve, an inner collapsible tube disposed about said neck and forming with said reservoir an integral unit for receiving concentrate from said reservoir via said first non-return valve, said tube extending longitudinally and being of resiliency so as to be collapsible, and a one-way outwardly opening valve on the free end of said inner tube, means for dispensing a metered amount of concentrate including an outer collapsible tube disposed about said inner tube, a housing mounted about said tubes and spaced from said outer tube to form an annular space, and a pipe for supplying fluid to said space at a pressure in the range of 1–6 atomospheres to collapse said tube and dispense an increment of concentrate wherein said increment does not vary in volume with further increases in pressure.

* * * * *